CARD HOLDING TELEPHONE DIALING TOOL

Filed April 11, 1966

INVENTOR.
ANDREW E. RUSSELL
BY
James P. Malone

United States Patent Office 3,394,480
Patented July 30, 1968

3,394,480

CARD HOLDING TELEPHONE DIALING TOOL

Andrew E. Russell, 2412 Camp Ave., Bellemore, N.Y. 11710

Filed Apr. 11, 1966, Ser. No. 541,667
1 Claim. (Cl. 40—336)

ABSTRACT OF THE DISCLOSURE

A pencil like tool for dialing telephones, said tool being adapted to hold a plurality of cards for listing names and telephone numbers.

This invention relates to telephone dialing means and more particularly to a tool for dialing telephones, said tool being adapted to hold a plurality of cards for listing names and telephone numbers.

There is a need for dial telephone operating means which are adapted to display important telephone numbers so that in an emergency the user can call the police department, fire department, lighting company, or doctor without any delay. In the event of an emergency, such as a fire or an accident, people are liable to get excited and waste valuable time especially if they have to look up telephone numbers in a telephone book which may not be available.

The present invention provides a pencil like device with a ball-like end which is adapted to be held in the hand like a pencil. When it is desired to dial the number, the ball end is used instead of the finger.

The novel construction of the present device incorporates a transparent cover and a plurality of slots under the transparent cover so that a number of cards containing important names and telephone numbers may be inserted and instantly available.

The ball end of this device is preferably designed so that it may be inserted in a dial aperture in such a manner that it will lock on the dial and support the member on the telephone.

Accordingly, a principal object of the invention is to provide new and improved means for operating dial telephones.

Another object of the invention is to provide new and improved means for operating dial telephones which is adapted to receive a plurality of tab cards for listing important names and telephone numbers.

Another object of the invention is to provide new and improved telephone dialing operating means which is adapted to display important names and telephone numbers where they are available with no delay.

Another object of the invention is to provide new and improved telephone dial tool means which is adapted to be attached to the telephone when not in use.

These and other objects of the invention will be apparent from the following specification and drawings of which:

Figure 1:
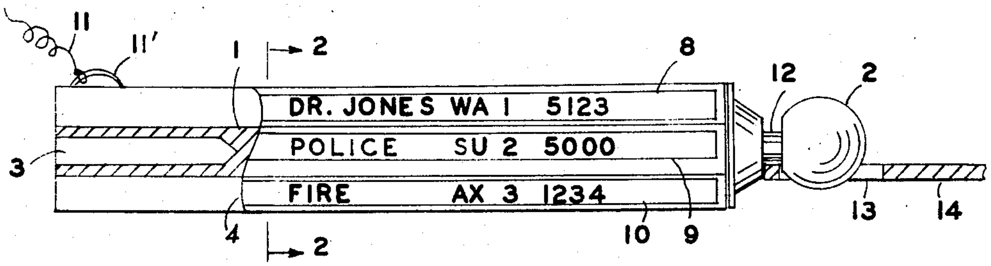
FIGURE 1 is a side view of the embodiment of the invention partially cut away.
Figure 2:
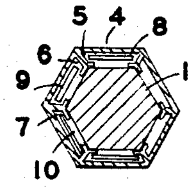
FIGURE 2 is a sectional view of FIGURE 1 taken along the lines 2—2 of FIGURE 1 and rotated 30°.

Referring to the drawings, the invention generally comprises an elongated core member 1 which may be a solid plastic member preferably with a flat side cross section. Mounted on one end of the core member 1 is a ball member 2 which has a round configuration, the diameter of which is adapted to fit in the phone dial finger apertures. The other end of the core member may have an aperture 3 which is adapted to receive a pencil.

Mounted over the core member is a transparent cover member 4 which is preferably flat sided, for instance having a hexagonal shape. The cover member has a plurality of slots 5, 6, 7, etc. which are adapted to receive cards 8, 9, 10 etc. The cards may be printed, typed or written upon in order to inscribe thereon important names and telephone numbers as the police department, fire department, doctor, drug store, etc. The cover member has preferably a press fit on the core member 1 so that no additional fastening means is necessary. Alternatively, the slots may be cut in the core member.

The cards may be inserted by sliding out the core member which would open the ends of the slots in the cover member so that the cards may be slid in. The core member is then reinserted and the device is ready for use.

The assembly preferably has means to attach it to the phone so that it will not become lost or misplaced. This means may comprise a spring like wire 11 which is adapted to be connected to a loop 11' fastened to the cover member. The other end of the spring wire would be connected to the telephone by a convenient means.

The ball member has a slotted throat 12 dimensioned so that when the device is inserted in a finger aperture 13 of the dial 14, as shown in FIGURE 1, it will lock on the telephone dial without falling out of the dial. If desired a wavy spring washer may be mounted in slot 12 to assist the clamping action.

Alternatively, a magnet may be incorporated in the ball member by making it of magnetic material for the purpose of mounting the device onto the phone. In this event, the ball member would be magnetically secured to a metal part of the phone for instance, the center part of the dial.

Many modifications of the invention may be made by those who desire to practice the invention without departing from the scope thereof which is defined by the following claim.

I claim:

1. A tool for dial telephones comprising:
an elongated flat sided pencil like tool comprising a core member having longitudinal recesses,
a transparent cover member adapted to fit over said core member,
a ball member adapted to be mounted at one end of said core and cover members,
said cover and core members being adapted to receive a plurality of tab cards adapted to display names and telephone numbers along the long axis of said tool, said ball member being of magnetic material for attaching it to a telephone, and a slotted throat in said tool adjacent said ball adapted to fit in a finger aperture of a telephone dial and hold the tool member in position on the phone.

References Cited

UNITED STATES PATENTS

| | | | |
|---|---|---|---|
| 1,158,251 | 10/1915 | McDougall. | |
| 2,358,791 | 9/1944 | Collopy et al. | 120—1 XR |
| 2,682,123 | 6/1954 | Fredrickson | 40—334 |
| 2,821,036 | 1/1958 | Ligouri | 40—334 |
| 2,964,812 | 12/1960 | Cook | 120—84 XR |

EUGENE R. CAPOZIO, *Primary Examiner.*

W. H. GRIEB, *Assistant Examiner.*